(12) United States Patent
Matthews et al.

(10) Patent No.: US 8,459,026 B2
(45) Date of Patent: Jun. 11, 2013

(54) CENTRAL TURBOCHARGER MOUNTING CONFIGURATION FOR A TWIN-TURBO ENGINE

(75) Inventors: Patrick Matthews, West Bloomfield, MI (US); Fadi Maroun Naddaf, Macomb Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 668 days.

(21) Appl. No.: 12/691,536

(22) Filed: Jan. 21, 2010

(65) Prior Publication Data

US 2011/0174247 A1 Jul. 21, 2011

(51) Int. Cl.
*F02B 33/44* (2006.01)

(52) U.S. Cl.
USPC .............................. 60/612; 60/605.1; 123/568

(58) Field of Classification Search
USPC ............................ 60/562, 612, 605.1; 123/562
See application file for complete search history.

(56) References Cited

U.S. PATENT DOCUMENTS

| 2,113,077 A | 4/1938 | Buchi | |
| 2,238,889 A | 4/1941 | Kollmann | |
| 2,739,440 A * | 3/1956 | Reiter et al. | 60/599 |
| 4,196,593 A | 4/1980 | Froeliger | |
| 4,458,491 A * | 7/1984 | Deutschmann | 60/612 |
| 5,142,867 A * | 9/1992 | Bergmann et al. | 60/612 |
| 5,440,881 A | 8/1995 | Sudmanns et al. | |
| 6,338,250 B1 * | 1/2002 | Mackay | 60/612 |
| 6,378,309 B1 | 4/2002 | Divecha et al. | |
| 6,564,783 B2 | 5/2003 | Chou et al. | |
| 7,310,947 B2 | 12/2007 | Baumann | |
| 7,571,717 B2 * | 8/2009 | Nelson | 123/562 |
| 7,908,860 B2 * | 3/2011 | Trombetta et al. | 60/612 |
| 8,056,525 B2 * | 11/2011 | Currie et al. | 123/184.34 |
| 8,146,359 B2 * | 4/2012 | Currie et al. | 60/612 |
| 2005/0172629 A1 * | 8/2005 | Baumann | 60/612 |
| 2006/0021606 A1 | 2/2006 | Bryant | |
| 2007/0056281 A1 * | 3/2007 | Arvan et al. | 60/598 |
| 2008/0216788 A1 | 9/2008 | Henrich et al. | |
| 2009/0000275 A1 * | 1/2009 | Zielke et al. | 60/278 |
| 2009/0078240 A1 * | 3/2009 | Diggs et al. | 123/559.1 |

\* cited by examiner

*Primary Examiner* — Thomas Denion
*Assistant Examiner* — Patrick Maines
(74) *Attorney, Agent, or Firm* — Julia Voutyras; Alleman Hall McCoy Russell & Tuttle LLP

(57) ABSTRACT

A central turbocharger configuration in a V-engine with two turbochargers is described. In one example approach, a V-engine includes first and second in-board exhaust manifolds; first and second turbines coupled to the first and second manifolds, respectively; and a passage intermediate to and coupling outlets of the first and second turbines; and a junction branching from the passage downward into the valley.

20 Claims, 3 Drawing Sheets

CENTRAL TURBOCHARGER MOUNTING CONFIGURATION FOR A TWIN-TURBO ENGINE

FIELD

The present disclosure relates to a central turbocharger arrangement in a V-engine.

BACKGROUND AND SUMMARY

Internal combustion engines may be configured so that the cylinders and pistons are aligned in two separate planes or "banks" forming a "V" shape when viewed along the axis of the crankshaft. Such V-engines may be turbocharged and may include two turbochargers, one for each bank of the engine.

The inventors herein have recognized that the ducting required for such twin turbo configurations may be complex, with compressor inlet and outlet ducts, and turbine inlet and outlet ducts to be managed for each bank. The inventors have also recognized that such complex ducting systems may result in a greater amount of exposed hot piping and may not efficiently use space between banks of the engine.

In one example approach, a V-engine having a first and second bank forming a valley therebetween, comprises: first and second in-board exhaust manifolds on the first and second banks, respectively; first and second turbines coupled to the first and second manifolds, respectively; the first and second turbines between the first and second exhaust manifolds; a passage intermediate to and coupling outlets of the first and second turbines; and a junction branching from the passage downward into the valley.

In another example approach, a method of controlling a V-engine having a first and second bank forming a valley therebetween, comprises: directing exhaust flow from a first in-board exhaust manifold coupled to the first bank through a first turbine between the banks; directing exhaust flow from a second in-board exhaust manifold coupled to the second bank through a second turbine between the banks; coupling outlets of the first and second turbines and directing exhaust flow downward through the valley.

In this way, unused engine space between the banks may be used to route high temperature exhaust pipes away from the two turbochargers in a V-engine, freeing up more space around the engine. Further, complexity of the ducting configurations may be reduced. Such simplified ducting may lead to more efficient cooling solutions, lower manufacturing costs, and improved engine accessibility for repairs and maintenance, for example.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
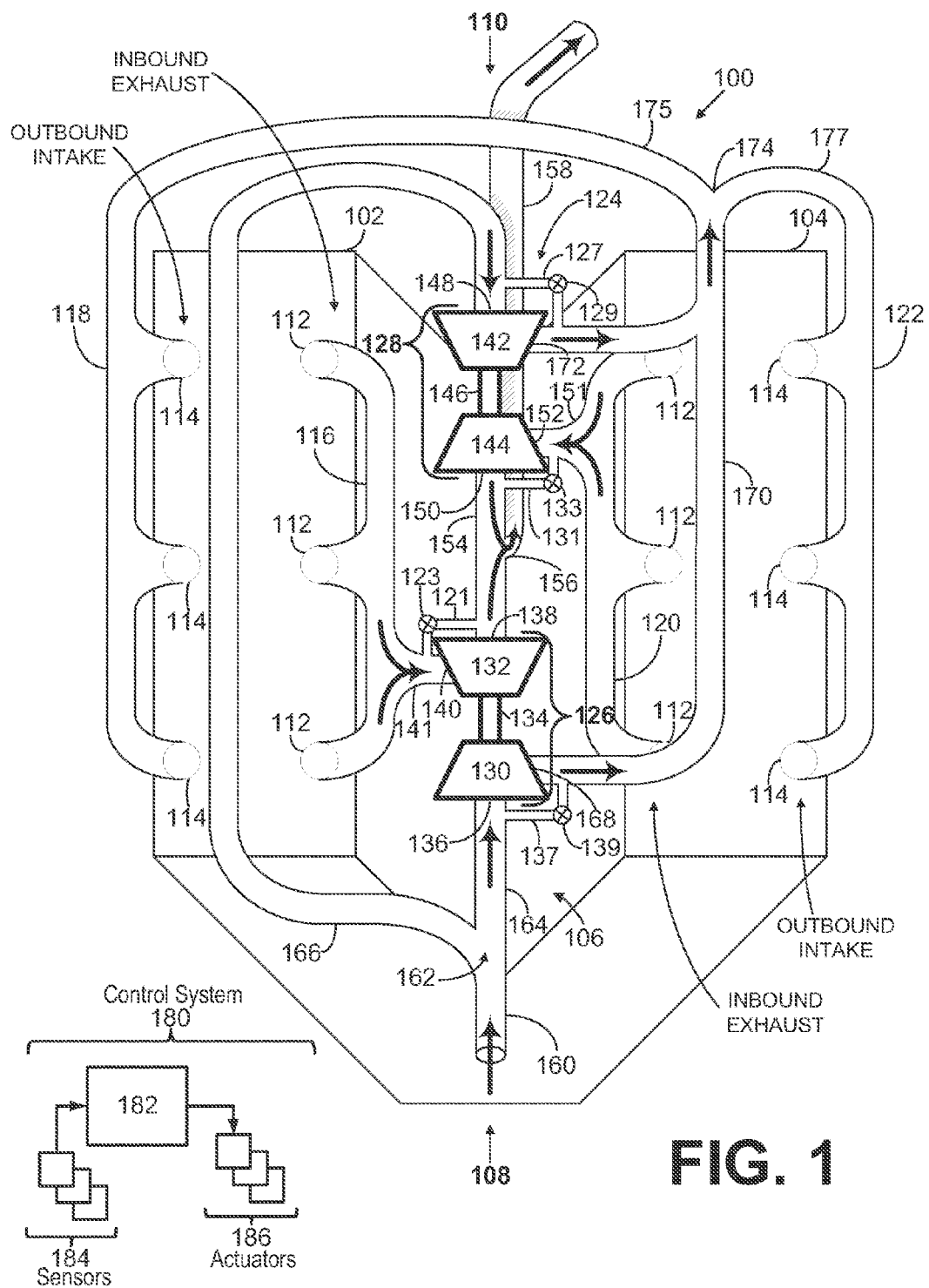
FIG. 1 shows a schematic top view of an engine with a central turbocharger arrangement.

The following description relates to a multi-turbocharger V-engine configuration. Various examples of the configuration are shown schematically in FIGS. 1-3. In some examples, an in-board exhaust configuration includes two turbochargers, one for each bank of the V-engine, arranged between the banks at least partly in the valley, as shown in FIG. 1. The turbine exits of each of the two turbochargers face one another and are combined together at a junction, before branching downward into the valley, and then traversing along the crankshaft axis out of the valley as shown in FIGS. 2A-2B and 3A-3B.

Specifically, the example V-engine shown schematically in FIGS. 1-3 includes two turbochargers positioned in a center portion of the engine between the banks of the engine above the valley formed by the banks so as to advantageously use space between the banks. Exhaust manifolds, coupled to in-board exhaust ports located on the banks, may include outlets oppositely positioned at front and rear portions of the engine, e.g., one exhaust manifold outlet adjacent to a front portion of the engine and one exhaust manifold outlet adjacent to a back portion of the engine. The outlets of the exhaust manifolds may be coupled to inlets of respective turbines of the turbochargers positioned between the banks of the engine and on a common axis of rotation.

Furthermore, the turbochargers may be oriented within the banks so that the outlets of the turbines face each other between the banks. As such, the turbine outlets may be coupled to a common passage intermediate to the turbine outlets in the center of the engine. The common passage between the outlets of the turbines may include a junction branching from the intermediate passage downward below the turbochargers into the valley of the engine. In this way, exhaust gas may be routed down through the valley, beneath one of the turbochargers, and out one end of the engine (e.g., the front, or back, of the engine).

Further still, the inlets of the compressors of the turbochargers may face away from each other towards opposing ends of the engine. For example, one compressor inlet may face the front of the engine and the other compressor inlet may face the back of the engine. A branched intake conduit may be coupled to the inlets of the compressors to provide intake air to the compressors. Outlets of the compressors may be oriented toward a common bank of the engine so that the compressor outlets may be coupled to a common conduit. The common conduit may then direct compressed air to the intake manifolds on the opposing banks of the engine.

In this way, complexity of ducting may be reduced, space between the banks may be more efficiently used, and exposed hot piping may be reduced.

Figure 2A:
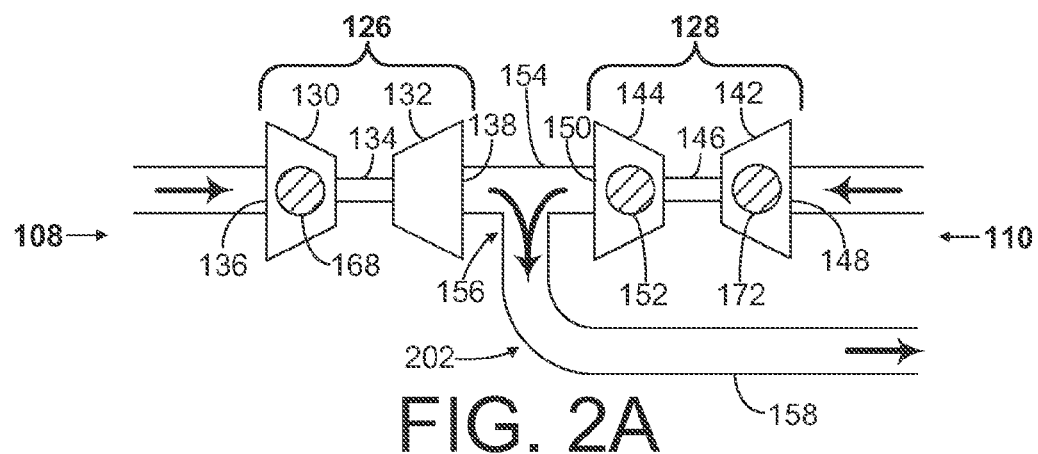
FIG. 2 shows schematic side views of a central turbocharger arrangement.
Figure 2B:
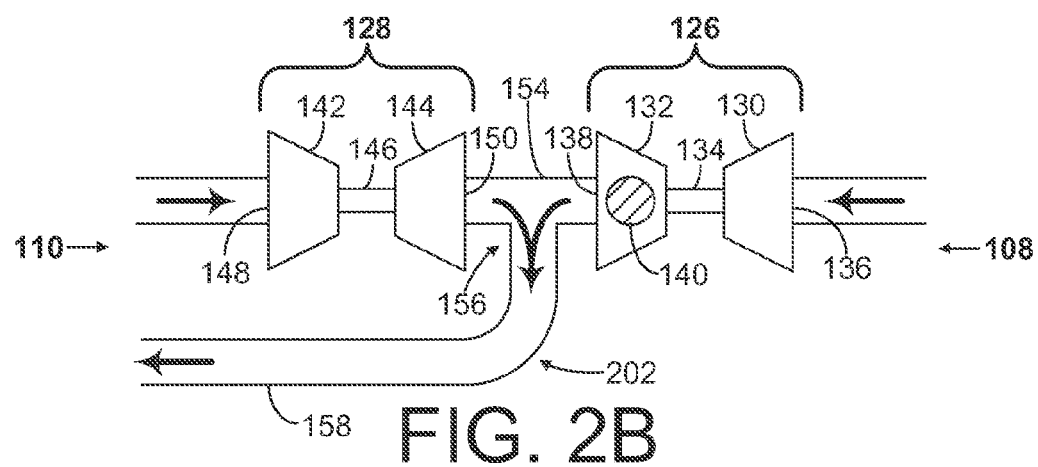
Figure 3A:
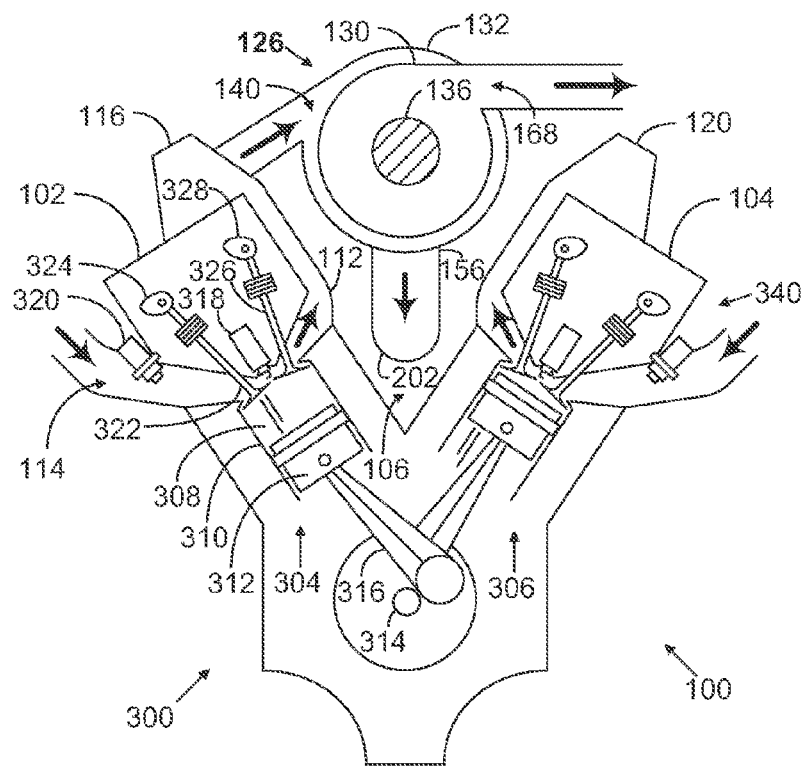
FIG. 3 shows schematic end views of an engine with a central turbocharger arrangement.
Figure 3B:
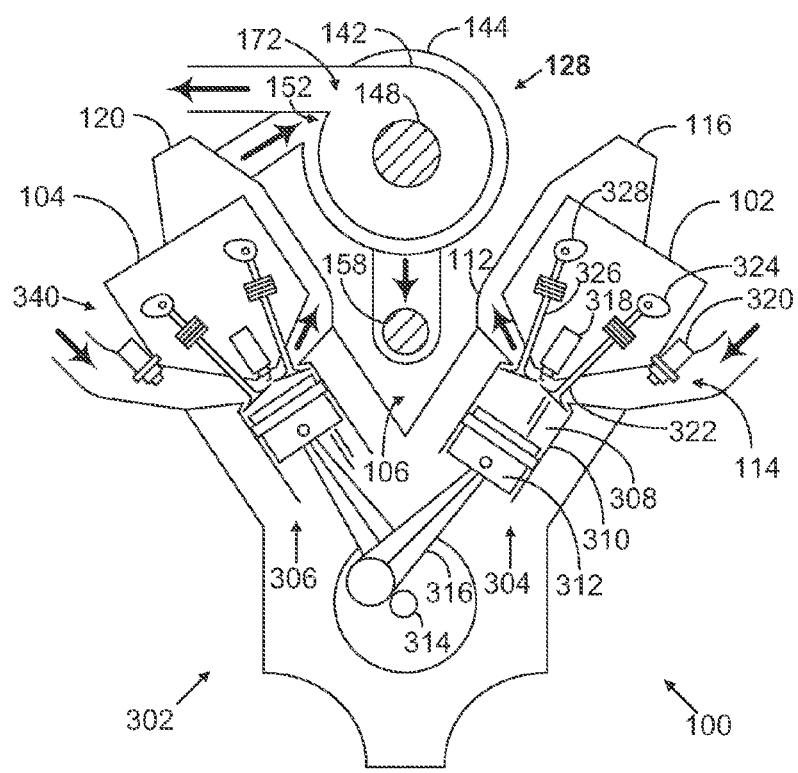

Turning now to the figures in detail, FIG. 1 shows a schematic top-view of an example V-engine 100 with a central turbocharger arrangement 124 positioned between the banks 102, 104 of the engine. Schematic side-views of the central turbocharger arrangement 124 are shown in FIG. 2. Specifically, FIG. 2A shows the central turbocharger arrangement 124 as viewed from a bank 104 of engine 100, and FIG. 2B shows the central turbocharger arrangement 124 as viewed from a bank 102 opposing bank 104 of engine 100. FIG. 3 shows schematic end-views of engine 100 along the crankshaft 314. Specifically, FIG. 3A shows a view of engine 100 from a first end 108, e.g. from a front end, and FIG. 3B shows a view of engine 100 from a second end 110, e.g. a back end.

In FIGS. 1-3, bold arrows indicate the direction of air or exhaust flow through the various passages in engine 100.

As described above, engine 100 may be configured so that the cylinders and pistons are aligned in two separate planes or "banks" forming a "V" shape when viewed along the axis of the crankshaft 314. FIGS. 1 and 3 show a first bank 102 on a first side of the engine and a second bank 104 on a second side of the engine. The banks may intersect forming a valley 106 between the banks. The valley 106 forms a central space in the engine between the banks and recessed from a top portion of the banks. Furthermore, engine 100 has a first end 108 (e.g., a front end) and an opposed second end 110 (e.g., a back end) in a direction parallel to crankshaft 314 of engine 100.

The first and second banks each include a plurality of cylinders with corresponding exhaust ports 112 and intake ports 114 disposed along heads 340 of the cylinders. Two example cylinders are shown in detail in FIG. 3 and described in more detail below herein. It should be appreciated that though the example engine in FIG. 1 shows a V-6 engine, the banks may include any number of cylinders. For example, engine 100 may be a V-4, V-8, or V-12 engine, among others.

Inbound cylinder exhaust ports 112 located on the banks of engine 100 may be positioned on sides of the cylinder heads 340 adjacent to the valley. Outbound cylinder intake ports 114 may be positioned adjacent to sides of the cylinders heads 340 opposed to the sides facing the valley. In this way, exhaust exiting the cylinders may be directed to turbines positioned between the banks with a reduced amount of ducting. Alternatively, the cylinder exhaust ports may be positioned adjacent to sides of the cylinders heads opposed to the sides facing the valley while the intake ports may be positioned on sides of the cylinder heads adjacent to the valley. However, in the latter scenario, a greater amount of ducting may be required to couple the outlets of the exhaust manifold to the inlets of the turbines located between the banks of the engine.

The first bank 102 includes an inbound exhaust manifold 116 coupled to the exhaust ports 112 and an outbound intake manifold 118 coupled to the intake ports 114 on the first bank. The second bank 104 includes an inbound exhaust manifold 120 coupled to the exhaust ports 112 and an outbound intake manifold 122 coupled to the intake ports 114 on the second bank. The inbound exhaust manifolds may be positioned adjacent to sides of the banks facing toward the valley of the engine. In one example, the exhaust manifolds may be integrated into the cylinder heads on the banks, where the multiple exhaust ports feed into a single conduit forming the manifold. In another example, separate manifolds and heads may be used. Furthermore, the exhaust manifolds may cooled by a variety of methods. For example, the manifolds may be water-cooled.

The exhaust manifolds may be oriented with outlets of the manifolds facing toward the space between the banks of the engine. Further, an outlet of a given exhaust manifold may be adjacent to an end of the given exhaust manifold. For example, exhaust manifold outlet 141 may be adjacent to an end of exhaust manifold 116 at end 108 of the engine. Likewise, exhaust manifold outlet 151 may be adjacent to an end of exhaust manifold 120 at end 110 of the engine. Further, outlets of the first and second exhaust manifolds may be adjacent to opposing first and second ends, respectively, of the engine. For example, an outlet of exhaust manifold 116 may be adjacent to end 108 while an outlet of exhaust manifold 120 may be adjacent to opposing end 110 of engine 100. The outlets 141 and 151 of the exhaust manifold may be directly coupled to inlet 140 of a turbine 132 and inlet 152 of a turbine 144, respectively, positioned between the banks of the engine.

The central turbocharger arrangement 124 includes a first turbocharger 126 positioned between the banks and above the valley of engine 100 adjacent to the first end 108, and a second turbocharger 128 positioned between the banks and above the valley of engine 100 adjacent to the second end 110. Turbochargers 126 and 128 may be arranged in parallel, with one turbocharger assigned to each cylinder bank. For example turbocharger 128 may be assigned to bank 104 and turbocharger 126 may be assigned to bank 102. Assignment of a turbocharger to a given bank may include coupling the compressor output of the turbocharger with the intake manifold on the given bank and coupling the turbine input of the turbocharger with the exhaust manifold on the given bank. Such a configuration may simplify plumbing as compared with a single turbocharger configuration in which a single turbocharger is assigned to both banks of the engine. Further, the two turbochargers may be positioned directly above valley 106 so that there is a space formed between the turbochargers and a trough of the valley 106 of the engine.

The first turbocharger 126 includes a compressor 130 and a turbine 132 connected by a shaft 134. Shaft 134 may be positioned in a direction parallel to the crankshaft, for example. The compressor and turbine of first turbocharger 126 may be oriented so that an inlet 136 of compressor 130 faces the first end 108 and an outlet 138 of turbine 132 faces the second end 110.

The second turbocharger 128 includes a compressor 142 and a turbine 144 connected by a shaft 146. Shaft 146 may be positioned in a direction parallel to the crankshaft, for example. The compressor and turbine of second turbocharger 128 may be oriented so that an inlet 148 of compressor 142 faces the second end 110 and an outlet 150 of turbine 144 faces the turbine outlet 138 of the first turbocharger.

The turbines 132 and 144 may be driven by exhaust gases from the engine, thereby driving the compressors 130 and 142 via the respective drive-shafts 134 and 146. The compressors may be configured to compress intake air delivered to the cylinders, thereby providing boost to the engine. It will be appreciated that alternate turbocharger configurations may be used in other examples. For example, the central turbocharger arrangement may include a single compressor coupled by shafts to two centrally positioned turbines with turbine outlets facing each other between the banks of engine 100.

Further, the positioning of components of the turbochargers positioned between the banks of the engine may depend on the positioning of a configuration of the engine and various positions of components of the engine. In one example, the first and second turbochargers may be positioned at a same distance and along the same axes parallel to the crankshaft above the valley of the engine. In another example, the first turbocharger, or one or more components thereof, may be positioned at a first distance above the valley and the second turbocharger, or one or more components thereof, may be positioned at a second distance different from the first distance above the valley of the engine.

In some examples, one or more compressor bypass passages and/or compressor bypass valves may be provided. As shown in FIG. 1, a first compressor bypass passage 137 and compressor bypass valve 139 may be provided for enabling intake air to bypass compressor 130. Similarly, a second compressor bypass passage 127 and compressor bypass valve 129 may be provided for enabling intake air to bypass compressor 142. In this way, the amount of air flowing through compressors 130 and 142 may be individually controlled by varying the amount of bypass air via valves 139 and 129, respectively. In other examples, a single compressor bypass passage and associated bypass valve (e.g., a surge valve) may be provided to enable the intake air to bypass both compressors via a common bypass passage. The position of bypass valves 139 and 129 may be individually controlled via a control system 180 to vary the flow rate of intake air through passages coupled to the inlets compressors 130 and 142, respectively.

Furthermore, exhaust turbine bypass passages and/or turbine bypass valves may be provided. Such turbine bypass valves will be described herein as wastegate valves so that they may be more easily distinguished from the compressor bypass valves described above. As shown in FIG. 1, a first wastegate valve 123 may be provided along turbine bypass passage 121 for enabling exhaust gases to bypass turbine 132. Similarly, a second wastegate valve 133 may be provided along turbine bypass passage 131 for enabling exhaust gases to bypass turbine 144. In this way, the amount of exhaust gases flowing through turbines 132 and 144 may be individually controlled via control system 180 to vary the amount of exhaust gases flowing through wastegate valves 123 and 133, respectively.

In some examples, the turbines may be a variable geometry turbines configured to adjust the geometry (e.g. turbine inducer flow area or nozzle angle) of the turbine based on vehicle operating conditions. In this way, boost may be provided to the engine over a wide range operating conditions (e.g. engine speeds, loads, etc.), increasing the vehicle's performance. The variable geometry turbine may include an actuator (e.g. membrane actuator, electric servo actuator) configured to adjust the geometry of the turbine. Suitable variable geometry turbines include an adjustable vane turbine and an adjustable nozzle turbine. If a variable geometry turbine is utilized the wastegate valves and bypass conduits may not be included in engine 100 or visa-versa, in some examples. However, in other examples a fixed geometry turbine may be utilized. When a fixed geometry turbine is utilized, the wastegate valves configured to adjust the turbo speed through a turbine bypass conduit coupled upstream and downstream of the turbine may also be included in the turbocharger system. However, in other examples, both a wastegate and variable geometry turbine may be included in the turbocharger system. However, in other examples, just the wastegate or the variable geometry turbine may be included in the turbocharger system and a fixed or variable geometry compressor may be utilized. It will be appreciated that the turbocharger system may be operated to provide varying levels at boost during various operating conditions. For example, the geometry of the turbine and/or the exhaust gas provided to the turbine may be adjusted to alter the amount of boost provided by the turbocharger system.

An intermediate passage 154, e.g., a common conduit, may couple the central-facing turbine outlets 138 and 150 of the first and second turbochargers together. Since the turbine outlets may be facing each other in a center portion of the engine between the banks, coupling the turbine outlets in this way may reduce the amount of ducting required to direct exhaust gas out of the engine. Intermediate passage 154 may include a junction 156. Junction 156 may be any type of junction which combines the exhaust from the outlets of the turbines into a common conduit and routes the exhaust from the turbines down through the valley of the engine. For example, junction 156 may include a T-joint or similar type ducting.

The exhaust from the turbines may be routed via junction 156 downwards toward the valley 106 via a common exhaust conduit 158. For example, as shown in FIGS. 2A and 2B, exhaust conduit 158 may include a bend 202, e.g. a 90 degree bend, to route exhaust gas via conduit 158 down through the valley and out one end of the engine. Conduit 158 may be positioned below the turbochargers within the valley of the engine and may pass beneath one of the turbochargers to exit the engine. For example, conduit 158 may pass below turbocharger 128 to exit the engine at end 110. Once exhaust conduit 158 exits the engine, it may be coupled with an exhaust aftertreatment system or vehicle tailpipe, for example.

Air may enter the engine via conduit 160 positioned at end 108 of engine 100. For example, air may enter conduit 160 after passing through an air filter. Conduit 160 may include a branch point 162 which splits conduit 160 into a first branch 164 coupled to the intake 136 of compressor 130 and a second branch 166 coupled to the intake 148 of compressor 142. In this way, air may be directed to the inlets of both compressors 130 and 142. Since the inlets of the compressors may face towards opposing ends of the engine, conduit 160 may include ducting positioned above a top surface of the engine. For example, conduit branch 166 of conduit 160 may be positioned above bank 102 so as to deliver air to inlet 148 of compressor 142. Alternatively, the positioning of the branches 164 and 166 of intake conduit 160 may depend on a configuration of engine 100. For example, branch conduits 164 and 166 may be positioned above, below, and/or around various engine components before being coupled to the respective compressor inlets 136 and 148.

Compressor outlets 168 and 170 of compressors 130 and 142, respectively, may face toward a common bank of the engine. For example, FIG. 1 shows the compressor outlets 168 and 172 facing toward bank 104. In another example, the compressor outlets may both face toward bank 102. In this way, the outlets 168 and 172 of compressors 130 and 142 may be coupled to a common conduit or passage 170. Conduit 170 may be positioned above the bank of the engine towards which the compressor outlets are facing. For example, when the compressor outlets both face toward bank 104, as shown in FIG. 1, conduit 170 may be positioned above bank 104. Furthermore, common conduit 170 may be positioned and/or routed above exhaust manifold 120. In other examples, the positioning of conduit 170 may depend on a particular engine configuration. For example conduit 170, may be positioned below exhaust manifold 120.

Compressed air exiting the compressors via conduit 170 may be split into a first branch conduit 175 and a second branch conduit 177 at a branch point 174. The branch point may be located adjacent to an end of the engine above a bank of the engine, e.g., adjacent to end 110 and above bank 104. The first and second branch conduits 175 and 177 may be coupled to the first and second intake manifolds 118 and 122, respectively. In this way, compressed air from the compressor outlets may be delivered to both intake manifolds on the opposing banks of engine 100. Since the common compressor output conduit 170 may be positioned above a common bank of the engine, branch conduit 175 may be positioned around and/or above various engine components so as to be coupled with intake manifold 118. In another example, junction 174 may be positioned along conduit 170 between the couplings with the compressor outlets. In this case, the branch conduits 175 and 177 may be positioned and/or routed above and/or around various engine components in order to be coupled with the respective intake manifolds.

Control system 180 is shown receiving information from a plurality of sensors 184 and sending control signals to a plurality of actuators 186. As one example, sensors 184 may include mass air flow (MAF) sensors, temperature sensors and various other sensors coupled to engine and/or exhaust components. Other sensors such as pressure and temperature sensors may be coupled to various locations in the vehicle. As another example, the actuators may include fuel injectors, e.g. fuel injector 320, valve actuators, wastegate and bypass valve actuators and various others. The control system 180 may include a controller 182. The controller may receive input data from the various sensors, process the input data, and trigger the actuators in response to the processed input data based on instructions or code programmed or encoded therein corresponding to one or more routines. In one example, controller may be a microcomputer, including microprocessor unit, input/output ports, an electronic storage medium for executable programs and calibration values, random access memory, keep alive memory, and a data bus.

Two example cylinders are shown in detail in FIGS. 3A and 3B. Cylinders 304 and 306, shown in FIG. 3, among other cylinders of the engine, may be identical in some examples and may include identical components. As such, only cylinder 304 will be described in greater detail.

With reference to FIG. 3, cylinder 304 includes a combustion chamber 308 defined by combustion chamber walls 310. A piston 312 is moveably disposed within combustion chamber 308 and is coupled to a crankshaft 314 via a crank arm 316. Cylinder 304 can include a spark plug 318 for delivering an ignition spark to combustion chamber 308. However, in some examples, spark plug 318 may be omitted, for example, where engine 100 is configured to provide combustion by compression ignition. Combustion chamber 308 may include a fuel injector 320, which in this example is configured as a port based fuel injector. However, in other examples, fuel injector 320 can be configured as a direct in-cylinder injector.

Cylinder 304 can further include at least one intake valve 322 actuated via an intake valve actuator 324 and at least one exhaust valve 326 actuated via an exhaust valve actuator 328. Cylinder 304 can include two or more intake valves and/or two or more exhaust valves along with associated valve actuators. In this particular example, actuators 324 and 328 are configured as cam actuators, however, in other examples, electromagnetic valve actuators (EVA) may be utilized. Intake valve actuator 324 can be operated to open and close intake valve 322 to admit intake air into combustion chamber 308 via intake port 114 communicating with intake manifold 118. Similarly, exhaust valve actuator 328 can be operated to open and close exhaust valve 326 to exhaust products of combustion from combustion chamber 308 into exhaust port 112. In this way, intake air may be supplied to combustion chamber 308 via intake port 114 and products of combustion may be exhausted from combustion chamber 308 via exhaust port 112.

It should be appreciated that cylinder 306 or other cylinders of engine 100 can include the same or similar components of cylinder 304 as described above. Furthermore, it should be understood that the banks 102 and 104 may include any number of cylinders, for example 4, 8, or 12 cylinders.

It will be appreciated that the systems, configurations, and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems, configurations, and methods, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A V-engine having a first and second bank forming a valley there between, comprising:
    first and second in-board exhaust manifolds on the first and second banks, respectively;
    first and second turbines coupled to the first and second manifolds, respectively;
    the first and second turbines between the first and second exhaust manifolds;
    a passage intermediate to and coupling outlets of the first and second turbines; and
    a junction branching from the passage downward into the valley.

2. The engine of claim 1 further comprising a valley passage coupled to the junction and exiting the engine, said valley passage positioned in the valley under one of the turbines.

3. The engine of claim 2 further comprising first and second compressors, wherein inlets of the first and second compressors face toward opposing ends of the engine.

4. The engine of claim 3 wherein outlets of the first and second compressors are oriented towards a common bank of the engine.

5. The engine of claim 3 further comprising a passage coupled to outlets of the compressors.

6. The engine of claim 3 further comprising a passage coupled to the inlets of the compressors.

7. The engine of claim 1 wherein the junction is a T-joint.

8. The engine of claim 1 wherein the manifolds are integrated into cylinder heads of the engine.

9. The engine of claim 8 wherein the manifolds are water-cooled.

10. The method of claim 1 wherein the first turbine is fluidically coupled only to the first exhaust manifold and the second turbine is fluidically coupled only to the second exhaust manifold.

11. An internal combustion engine, comprising:
    a first and second bank forming a valley; the engine having a first and second end in a direction parallel to the banks;
    first and second in-board exhaust manifolds coupled to the first and second banks, respectively;
    first and second turbines coupled to the first and second exhaust manifolds, respectively, the turbines at opposite ends of the engine;
    a passage intermediate to and coupling outlets of the first and second turbines; the outlets facing each other toward opposing ends of the engine; and
    a junction branching from the passage downward into the valley.

12. The engine of claim 11 further comprising first and second compressors, wherein inlets of the first and second compressors face toward opposing ends of the engine.

13. The engine of claim 12 wherein outlets of the first and second compressors are oriented towards a common bank of the engine.

14. The engine of claim 12 further comprising a passage coupled to outlets of the compressors.

15. The engine of claim 12 further comprising a passage coupled to the inlets of the compressors.

16. The engine of claim 11 further comprising a valley passage coupled to the junction and exiting the engine, said valley passage positioned in the valley under one of the turbines.

17. A method of controlling a V-engine having a first and second bank forming a valley therebetween, comprising:
- directing exhaust flow from a first in-board exhaust manifold coupled to the first bank through a first turbine between the banks;
- directing exhaust flow from a second in-board exhaust manifold coupled to the second bank through a second turbine between the banks; and
- directing exhaust flow from each turbine in a combined passage downward through the valley.

18. The method of claim 17 further comprising directing exhaust flow beneath one of the turbines and out the engine.

19. The method of claim 17, further comprising directing air flow into a first and second compressor, inlets of the compressors facing opposing ends of the engine.

20. The method of claim 19, further comprising joining outlet flows from the compressors into a common passage, the outlets of the compressors facing opposing sides of the engine.

* * * * *